Patented Jan. 22, 1935

1,988,632

UNITED STATES PATENT OFFICE 1,988,632

AMINE SALTS OF ANTIMONIC AND PHENYL STIBONIC ACIDS AND PROCESS OF PREPARING THE SAME

Hans Schmidt, Elberfeld-Vohwinkel, Germany, assignor to Winthrop Chemical Company, Inc., New York, N. Y., a corporation of New York No Drawing. Application April 5, 1929, Serial No. 352,898. In Germany February 24, 1927

30 Claims. (Cl. 260—11)

The present invention relates to a process of preparing stable, medicinally active amine salts of antimonic and phenyl stibonic acids with amines and to the new substances obtainable thereby.

In accordance with the present invention, pharmaceutically valuable substances are obtained by reacting upon an antimony acid or a stibonic acid, such as a phenyl stibonic acid which may be represented by the formula:

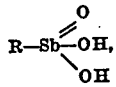

wherein R stands for a phenyl radical which may be substituted for example by halogen, the amino-, substituted amino-, hydroxy-groups, or by reacting upon said acids of antimony in their higher molecular complex state (compare Schmidt, Annalen der Chemie, volume 421, page 174 following) with a primary, secondary or tertiary amine, such as methylamine, diethylamine, piperazine, quinine and the like at room temperature or at most at the temperature of the water bath. The process is carried out by allowing the two components to interact upon each other either in aqueous solution or in a suitable organic solvent, such as methylalcohol or ethylalcohol; the most favorable method of carrying out the process consists in finely suspending the organic or inorganic antimony acid in water, and introducing in small portions an amine until the whole of the antimony acid has dissolved. The quantities of the two components which may be allowed to react upon each other may be varied within the widest limits, but generally less than an equivalent of the amine calculated on the stibonic or antimonic acid being sufficient, due to the high-molecular state, in which the acids of antimony generally are present. Owing to this complex state of the antimony acids of antimony are present in a complex state, a formula of the products formed or an equation of the process cannot be given. But it may be stated that, of course, the reaction between the antimony acids and the amines substantially appears as a neutralization of the acidity of the antimony acids by the amines. From their solutions, the new compounds are obtainable by evaporating to dryness or by adding an organic precipitant, such as ether or acetone.

The new compounds are generally colorless to yellowish colored powders, which are generally soluble in water and which are pharmaceutically valuable substances against infectious diseases, especially for injections.

The following examples will illustrate my invention, without limiting it thereto:

*Example 1.*—Para-aminophenyl stibonic acid, obtainable in the known manner by saponification of 150 grams of para-acetylaminophenyl stibonic acid, is shaken, while still moist with a twice normal aqueous solution of diethylamine. The diethylamine solution is gradually added until solution is effected. The solution is filtered and the diethylene-para-aminophenyl stibonate formed is precipitated by pouring its solution into acetone; the precipitated product is filtered and dried in a desiccator. A pale colored powder is obtained, dissolving in water, even after prolonged storing to give a solution of the desired stability. On the addition of caustic alkali solution to the solution, an odor of diethylamine can be observed. On the addition of diluted hydrochloric acid and an aqueous solution of hydrogensulfide to the strongly diluted solution, it becomes yellow; on heating, antimony sulfide is formed. The dry substance decomposes on heating without melting.

*Example 2.*—Para-aminophenyl stibonic acid obtainable as described in Example 1, while still moist, is shaken with water whereby piperazine is added until a clear solution is obtained. The new piperazine-para-aminophenyl stibonate is separated as described in Example 1.

*Example 3.*—Antimonic acid, obtainable in the customary manner from antimony pentachloride by introducing the same into water, filtering and washing, is dissolved by means of a quantity of 5-normal diethylamine, necessary to produce a neutral solution; the solution is filtered and evaporated. The diethylamine antimonate remains behind in the form of glassy crusts, which on powdering yield a colorless powder, readily soluble in water.

*Example 4.*—65 grams of freshly precipitated, moist meta-chloro-para-acetylaminophenyl stibonic acid (=33 grams of the dry substance) are dissolved by means of 80 ccs. of methyl alcohol and the requisite quantity of twice normal diethylamine solution (about 25 ccs.). The solution is filtered and stirred into ether. Thereupon the diethylamine-meta-chloro-para-acetylaminophenyl-stibonate is precipitated in a finely divided state. After filtering and drying, a pale colored powder, readily soluble in water, is obtained. In a similar manner, there can be produced, for example, a diethylamine salt of di- (para-acetylaminodiphenyl)-stibonic acid.

*Example 5.*—Freshly precipitated, moist para-aminophenyl-stibonic acid is dissolved by grinding with an excess of ethylene diamine and after filtration the solution is precipitated by stirring into acetone. A pale colored powder of ethylene diamine-para-aminophenyl stibonate is obtained, readily soluble in water.

*Example 6.*—10 grams of para-acetylaminophenyl-stibonic acid and 10 grams of quinine base are dissolved by heating in 50 ccs. of methylalcohol. The solution is filtered and the quinine-para-acetylaminophenyl stibonate formed is precipitated by stirring into ether, filtered and washed with ether. The salt does not dissolve in water, but yields a neutral or nearly neutral suspension.

In a similar manner, there can be produced, for example, salts of other basic quinoline derivatives. A salt which is insoluble in water is also obtained when reacting, for instance, upon para-acetylaminophenyl stibonic acid with 1,2-dimethyl-3-dimethylamino-1-propyl - para-aminobenzoate of the formula

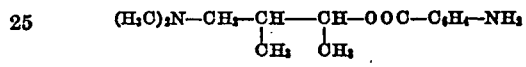

$(H_3C)_2N-CH_2-CH-CH-OOC-C_6H_4-NH_2$
$\phantom{(H_3C)_2N-CH_2-}\ CH_3\ \ OH_3$

*Example 7.*—Antimonic acid, obtainable from antimony pentachloride as described in Example 3, is dissolved on the water bath in a quantity of twice normal diethylaminoethanol solution, necessary for the production of a neutral solution; the solution is filtered and evaporated to dryness in vacuo. The diethylamino ethanol antimonate is obtained in the form of a colorless, somewhat hygroscopic powder, readily soluble in water.

*Example 8.*—100 grams of freshly precipitated, moist para-aminophenyl stibonic acid paste are shaken with some water and about 20 ccs. of twice normal diethylaminoethanol solution until dissolved. The solution is filtered, treated with diethylaminoethanol until it gives a weakly alkaline reaction, and the resulting diethylamino-ethanol-para-aminophenyl stibonate is precipitated by stirring the solution into acetone. After filtering and washing, it is dried in a desiccator. It is a pale colored powder, readily soluble in water.

*Example 9.*—100 grams of freshly precipitated, moist para-aminophenyl-stibonic acid paste are shaken with 150 ccs. of methylalcohol and 12 grams of quinine until solution has occurred. The quinine-para-aminophenyl stibonate formed is precipitated by pouring into ether, filtered and freed from excess quinine by washing with ether. After drying a pale colored powder is obtained, which yields in water a suspension having a neutral reaction.

This application is a continuation-in-part of my Ser. No. 254,900, filed February 16, 1928.

I claim:

1. The process which comprises suspending an antimonic acid of the group consisting of antimonic and phenyl-stibonic acids in water and slowly introducing an amine while stirring until a clear solution has formed.

2. The process which comprises suspending a phenyl-stibonic acid which is substituted in the phenyl nucleus by halogen, amino-, acylamino- or hydroxyl groups in water and slowly introducing an amine while stirring until a clear solution has formed.

3. The process which comprises suspending an amino-phenyl-stibonic acid in water and slowly introducing an amine while stirring until a clear solution has formed.

4. The process which comprises suspending para-amino-phenyl-stibonic acid in water and slowly introducing an amine while stirring until a clear solution has formed.

5. The process which comprises suspending an antimonic acid of the group consisting of antimonic and phenyl-stibonic acids in water and slowly introducing diethylamine while stirring until a clear solution has formed.

6. The process which comprises suspending a phenyl-stibonic acid which is substituted in the phenyl nucleus by halogen, amino-, acylamino- or hydroxyl groups, in water and slowly introducing diethylamine while stirring until a clear solution has formed.

7. The process which comprises suspending para-amino-phenyl-stibonic acid in water and slowly introducing diethylamine while stirring until a clear solution has formed.

8. A salt of an antimonic acid of the group consisting of antimonic acids and phenyl stibonic acids, with an amine, being generally a colorless to yellowish powder, being generally soluble in water and being a pharmaceutically valuable substance against infectious diseases.

9. A salt of a phenyl-stibonic acid which is substituted in the phenyl nucleus by halogen, amino-, acylamino- or hydroxyl groups, with an amine, being generally a colorless to yellowish powder, being generally soluble in water and being a pharmaceutically valuable substance against infectious diseases.

10. A salt of para-amino-phenyl-stibonic acid with an amine, being generally a colorless to yellowish powder, being generally soluble in water and being a pharmaceutically valuable substance against infectious diseases.

11. A salt of an antimonic acid of the group consisting of antimonic acids and phenyl stibonic acids, with diethylamine, being generally a colorless to yellowish powder, being generally soluble in water and being a pharmaceutically valuable substance against infectious diseases.

12. A salt of a phenyl-stibonic acid which is substituted in the phenyl nucleus, by halogen, amino-, acylamino- or hydroxyl groups, with diethylamine, being generally a colorless to yellowish powder, being generally soluble in water and being a pharmaceutically valuable substance against infectious diseases.

13. Diethylamine para-amino-phenyl-stibonate, being a pale colored powder, soluble in water and being a pharmaceutically valuable substance against infectious diseases.

14. The process which comprises reacting upon an antimonic acid of the group consisting of antimonic acids and phenyl stibonic acids with an amine.

15. The process which comprises reacting upon a phenyl-stibonic acid which is substituted in the benzene nucleus by halogen, amino-, acylamino- or hydroxyl groups with an amine.

16. The process which comprises reacting upon an amino-phenyl-stibonic acid with an amine.

17. The process which comprises reacting upon para-amino-phenyl-stibonic acid with an amine.

18. The process which comprises reacting upon a phenyl-stibonic acid with a secondary amine.

19. The process which comprises reacting upon a phenyl-stibonic acid which is substituted in the benzene nucleus by halogen, amino-, acylamino- or hydroxyl groups, with a secondary amine.

20. The process which comprises reacting upon an amino-phenyl-stibonic acid with a secondary amine.

21. The process which comprises reacting upon para-amino-phenyl-stibonic acid with a secondary amine.

22. The process which comprises reacting upon an antimonic acid of the group consisting of antimonic acids and phenyl-stibonic acids with an amine in a solvent of the group consisting of water, methylalcohol and ethylalcohol.

23. The process which comprises reacting upon a phenyl-stibonic acid which is substituted in the benzene nucleus by halogen, amino-, acyl-amino- or hydroxyl groups, with an amine in a solvent of the group consisting of water, methylalcohol and ethylalcohol.

24. The process which comprises reacting upon an amino-phenyl-stibonic acid with an amine in a solvent of the group consisting of water, methylalcohol and ethylalcohol.

25. The process which comprises reacting upon para-amino-phenyl-stibonic acid with an amine in a solvent of the group consisting of water, methylalcohol and ethylalcohol.

26. The process which comprises reacting upon a phenyl-stibonic acid with a secondary amine in a solvent of the group consisting of water, methylalcohol and ethylalcohol.

27. The process which comprises reacting upon a phenyl-stibonic acid which is substituted in the benzene nucleus by halogen, amino-, acyl-amino- or hydroxyl groups, with a secondary amine in a solvent of the group consisting of water, methylalcohol and ethylalcohol.

28. The process which comprises reacting upon an amino-phenyl-stibonic acid with a secondary amine in a solvent of the group consisting of water, methylalcohol and ethylalcohol.

29. The process which comprises reacting upon para-amino-phenyl-stibonic acid with a secondary amine in a solvent of the group consisting of water, methylalcohol and ethylalcohol.

30. Diethylaminoethanol antimonate, being a colorless, somewhat hygroscopic powder, readily soluble in water and being a pharmaceutically valuable substance against infectious diseases.

HANS SCHMIDT. [L. S.]

CERTIFICATE OF CORRECTION.

Patent No. 1,988,632.  January 22, 1935.

HANS SCHMIDT.

It is hereby certified that error appears in the printed specification of the above numbered patent requiring correction as follows: Page 1, first column, lines 3 and 4, strike out the words "with amines"; lines 43 and 44, strike out "of antimony are present in a complex state"; and second column, line 12, for "diethylene" read --diethylamine--; line 55, for "acetylaminodiphenyl" read --acetylaminophenyl--; and that the said Letters Patent should be read with this correction therein that the same may conform to the record of the case in the Patent Office.

Signed and sealed this 25th day of September, A. D. 1945.

Leslie Frazer (Seal)  First Asistant Commissioner of Patents.